(12) United States Patent
Carlson et al.

(10) Patent No.: US 7,303,131 B2
(45) Date of Patent: Dec. 4, 2007

(54) AUTOMATIC FOCUSING SYSTEM FOR IMAGING-BASED BAR CODE READER

(75) Inventors: Bradley S. Carlson, Huntington, NY (US); Eugene Joseph, Coram, NY (US); Kefie Lu, Dix Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 154 days.

(21) Appl. No.: 10/903,792

(22) Filed: Jul. 30, 2004

(65) Prior Publication Data
US 2006/0038017 A1 Feb. 23, 2006

(51) Int. Cl.
*G06K 7/10* (2006.01)
(52) U.S. Cl. ............................. 235/462.22; 235/462.2; 235/462.23; 235/462.24; 235/462.41
(58) Field of Classification Search ........... 235/462.11, 235/462.22, 462.23, 462.24, 462.32, 462.41, 235/472.02, 472.03
See application file for complete search history.

(56) References Cited

U.S. PATENT DOCUMENTS

| | | | |
|---|---|---|---|
| 4,843,416 A | 6/1989 | Brower | |
| 4,983,033 A | 1/1991 | Suzuki | |
| 5,814,827 A * | 9/1998 | Katz | 250/556 |
| 6,138,915 A * | 10/2000 | Danielson et al. | 235/472.02 |
| 6,318,635 B1 * | 11/2001 | Stoner | 235/462.45 |
| 6,431,452 B2 * | 8/2002 | Feng | 235/472.01 |
| 6,981,642 B2 * | 1/2006 | Krichever | 235/454 |
| 2005/0045725 A1 * | 3/2005 | Gurevich et al. | 235/454 |

OTHER PUBLICATIONS

M. Subbarao, T. Choi, A. Nikzad, "Focusing Techniques," *Dept. of Electrical Engineering, State University of New York, Stony Brook*, NY, Sep. 1992. 15 pages.

G. Surya, M. Subbarao, "Depth from Defocus by Changing Camera Aperture: A Spatial Domain Approach," *Dept. of Electrical Engineering, State University of New York, Stony Brook*, NY. 24 pages. (Publication date unknown, to the best of Applicants' knowledge the article is prior art to Applicants' invention).

Z. Zalevsky, Y. Shrot, U. Levy, D. Mendelovic "Novel Denoising Algorithm for Obtaining a Supperresolved Position Estimation," *Opt. Eng.* 41(6), pp. 1350-1357, Jun. 2002,. 8 pages.

M. Subbarao, J.K. Tyan, "The Optimal Focus Measure for Passive Autofocusing and Depth-from-Focus", *Department of Electrical Engineering, State University of New York, Stony Brook, NY. Proccedings of SPIE's International Symposium, Videometrics IV*, vol. 2598, pp. 89-99, Philadelphia, Oct. 1995. 15 pages.

* cited by examiner

*Primary Examiner*—Seung Ho Lee

(74) *Attorney, Agent, or Firm*—Tarolli, Sundheim, Covell & Tummino LLP

(57) ABSTRACT

An automatic focusing system for an imaging-based bar code reader. The automatic focusing system employs a two step process for moving a lens of an imaging system along its path of travel such that a sharp image of a target bar code is projected or focused onto an imaging system pixel array. The first step is laser ranging which utilizes a laser beam for range finding. Laser ranging determines a distance between the imaging system pixel array and the target bar code. Given the determined distance, the automatic focusing system moves the lens to a suitable position for imaging the target bar code. If ambient conditions prevent laser ranging from properly working, the second step is focus analysis. Focus analysis involves moving the lens in accordance with a search routine and analyzing image frames of the target object to find a suitable focus position.

39 Claims, 8 Drawing Sheets

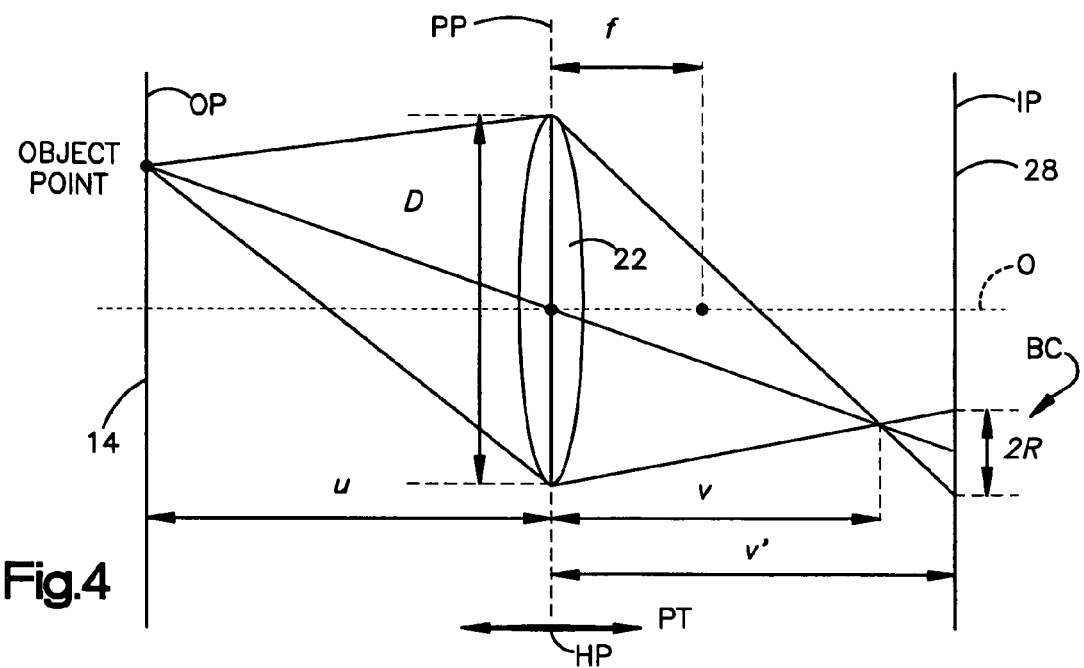
Fig.4
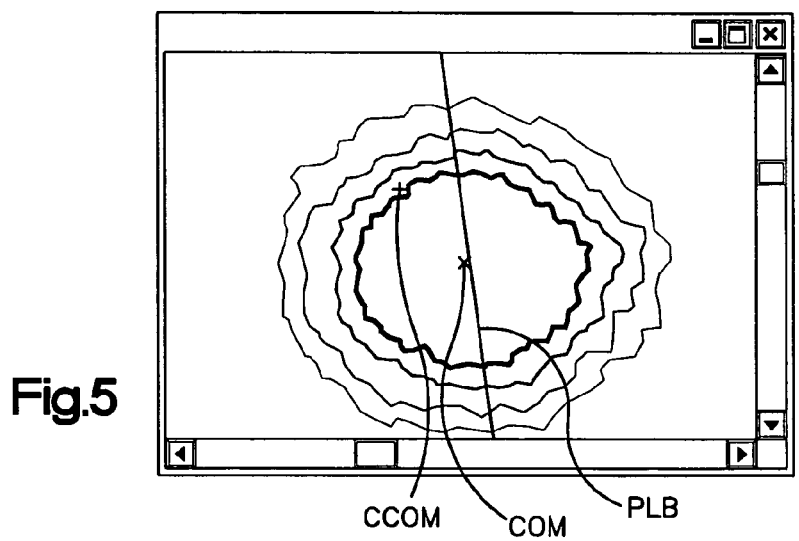
Fig.5
Single dot
Fig.6A
Multiple dots
Fig.6B

```
LaserRanger(image, lenspos, pline)
/***
* image - the image
* lenspos - the lens position at which the image is taken
* pline - the projection line of the laser calibrated at home position
***/
{
  Adjust pline to lenspos as Pline;

for( pixels in the neighborhood of Pline) {
    Histogram Ointensity Mi of each block B along Pline;
    Compute contrast C and average pixel value AVG;
 } if (C > Tc OR AVG > Tavg) {
     //Tc is contrast threshold, Tavg is threshold for average intensity in the image//
     report laser ranging failed;
     return; // image too bright
  } for (each block B) {
     if (B.Mi > Tbr)
         record B as  possible bright blocks containing the aiming pattern;
  } if (number of bright blocks > 3 OR 3 bright blocks not consecutive) {
       //more than one bright spots, sth.'s wrong
       Report laser ranging failed;
       return;
  } for (pixels in the bright blocks AND pixel> Tbr ){
      Compute COM Pc;
   } while (pixels exist with distance error to Pc > Terr){
     //Terr is error threshold//
     Remove those pixels;
     Re-compute COM Pc;
  }

Normalize Pc to home position;
   Compute distance;
   return;
}
```

Fig.7

```
GoldenSectionSearch ( a_0, b_0, τ, f, tol )
{
    k=0;
    r_0 = a_0 + τ(b_0 - a_0);
    l_0 = b_0 - τ(b_0 - a_0);
    while ( (b_k - a_k) > tol(b_0 - a_0) )
    {
        if f(l_k) < f(r_k)
        {
            a_{k+1} = l_k;
            b_{k+1} = b_k;
        }
        else
        {
            a_{k+1} = a_k;
            b_{k+1} = r_k;
        }
        r_{k+1} = a_{k+1} + τ(b_{k+1} - a_{k+1});
        l_{k+1} = b_{k+1} - τ(b_{k+1} - a_{k+1});
        k = k+1;
    } x = (b_k - a_k)/2;
    return x;
}
```

Fig.8

```
MedianPositionSearch (lRange, rRange, n)
{
    startPos = (lRange+rRange)/2;
    step = (rRange-lRange)/n;
    pos = startPos;
    dir = (rand()%2)?-1:1;
 initFocus = prevFocus = f(pos);
 hasSwitchDir = FALSE;

while (pos in [lRange, rRange])
    {
        if (dir == 1)
            pos = pos + step;
        else
            pos = pos - step;

if (f(pos) < prevFocus)
            if (!hasSwitchDir)
            {
                //we switch the search direction;
                step = -step;
                pos = startPos + step;
                prevFocus = initFocus;
            }
        else
            break;

return pos;
}
```

Fig.9

AUTOMATIC FOCUSING SYSTEM FOR IMAGING-BASED BAR CODE READER

FIELD OF THE INVENTION

The present invention relates to an automatic focusing system for an imaging-based bar code reader.

BACKGROUND OF THE INVENTION

Various electro-optical systems have been developed for reading optical indicia, such as bar codes. A bar code is a coded pattern of graphical indicia comprised of a series of bars and spaces of varying widths, the bars and spaces having differing light reflecting characteristics. Systems that read and decode bar codes employing CCD or CMOS-based imaging systems are typically referred to as imaging-based bar code readers or bar code scanners.

Imaging systems include CCD arrays, CMOS arrays, or other imaging pixel arrays having a plurality of photosensitive elements or pixels. Light reflected from a target image, e.g., a target bar code is focused through a lens of the imaging system onto the pixel array. Output signals from the pixels of the pixel array are digitized by an analog-to-digital converter. Decoding circuitry of the imaging system processes the digitized signals and attempts to decode the imaged bar code.

The ability of an imaging system to successfully decode an imaged bar code is directly dependent upon the ability to move the lens to a suitable position whereby a satisfactorily clear image of the target bar code is focused onto the pixel array. The imaging system focusing lens is driven by a motor, such as a piezo motor, along an axis perpendicular to the pixel array or sensor plane to permit focusing of the bar code image on the pixel array.

Whether the imaging system is housed in a handheld, portable bar code reader or a permanently mounted reader, the user of the device cannot be expected to manually focus the imaging system by moving the lens, thus, there is a need for an automatic focusing system or auto focus system for an imaging system.

Further, since imaging and decoding of a bar code must be completed in a very limited time frame, the auto focus system must be very rapid. Read times for barcode scanners range from 80 milliseconds (ms.) to a few hundred milliseconds, and read time differences of 10 ms. can result in measurable differences in productivity. A maximum read time of 100 ms. for linear barcodes is the target requirement for typical bar code readers.

For barcode scanning, the time typically allotted for auto focusing is on the order of 20 ms. The time required for a typical piezo motor to move the focusing lens over a range of 100 micrometers (um.) is approximately 10 ms. Thus only 10 ms. is available for an auto focus algorithm to determine the optimal focus position, which is challenging on a modern embedded microprocessor.

Bar code imaging systems require a variable focus optical system to maximize barcode reading range and deliver high quality images over a range of distances. The high scan rate for barcode reading imposes a high-speed requirement on the auto focusing technique to be used in the imaging system.

What is needed is a high speed, robust automatic focusing system for an imaging-based automatic identification system, such as a bar code reader.

SUMMARY OF THE INVENTION

The present invention is directed to an automatic focusing system for use in an imaging-based automatic identification system such as a bar code reader. The bar code reader includes a laser beam aiming pattern apparatus and the imaging system. The laser beam aiming pattern apparatus includes a laser diode and a diffractive optical element to project a laser aiming pattern on a target object, such as a bar code, to aid a user of the reader in aiming the reader at the target object. The imaging system includes a pixel array, a movable focusing lens to focus an image of the target object onto the pixel array and a motor to drive the lens along a path of travel.

The automatic focusing system utilizes laser light reflected from the target object to determine a distance between the imaging system and the target object. This is referred to as laser ranging. If the distance between the imaging system and the target object is successfully determined, the automatic focusing system determines a suitable position for the lens along its path of travel to properly focus an image of the target object onto the pixel array and operates the piezo motor to move the lens to the suitable position.

If the distance between the imaging system and the target object is not determined, the automatic focusing system uses a search routine or heuristic to move the lens from a home position along its path of travel, analyzes a multiplicity of images of the target object at different lens positions, determines a suitable lens position where the lens properly focuses an image of the target object onto the pixel array, and operates the motor to move the lens to the suitable position. This is referred to as focus analysis.

In one aspect, the invention features an automatic focusing system employing a two step process or method for focusing the imaging lens on a target object, such as a bar code: 1) laser ranging—using a laser beam for range finding, i.e., determining a distance between the imaging system and the target object to determine a suitable position of the imaging system lens for imaging the target object, then moving the lens to the suitable position; and, if ambient conditions prevent laser ranging from properly working, then 2) focus analysis—using a search routine to move the lens along its path of travel and analyzing multiple image frames of the target object to determine a suitable position of the lens with respect to the target bar code, then moving the lens to the suitable position.

For laser ranging, the automatic focusing system employs a laser parallax ranging algorithm to determine the distance between the imaging system and the target object. The laser diode generates a laser aiming pattern. The automatic focusing system uses the projected aiming pattern and the reflected laser light from the target object to compute a distance to the target object based on the parallax or offset between the laser beam and the imaging axis.

The automatic focusing system can position the imaging system lens in the correct focus position within a time frame of approximately 10 ms. when using laser ranging.

For focus analysis, the automatic focusing system utilizes a median position search routine to move the lens from its home position along its path of travel.

These and other objects, advantages, and features of the exemplary embodiment of the invention are described in detail in conjunction with the accompanying drawings.

BRIEF DESCRIPTION OF THE DRAWINGS

FIG. 4 is a schematic diagram of image formation in real aperture imaging;

FIG. 5 is representation of an image of a laser aiming pattern;

FIG. 6 is a representation of two laser aiming patterns;

FIG. 7 is pseudo code listing of a laser ranging algorithm of the present invention;

FIG. 8 is a program listing of a golden section search algorithm used to determine best focus position of a lens;

FIG. 9 is a program listing of a median position search algorithm used to determine best focus position of a lens;

DETAILED DESCRIPTION

Figure 1:
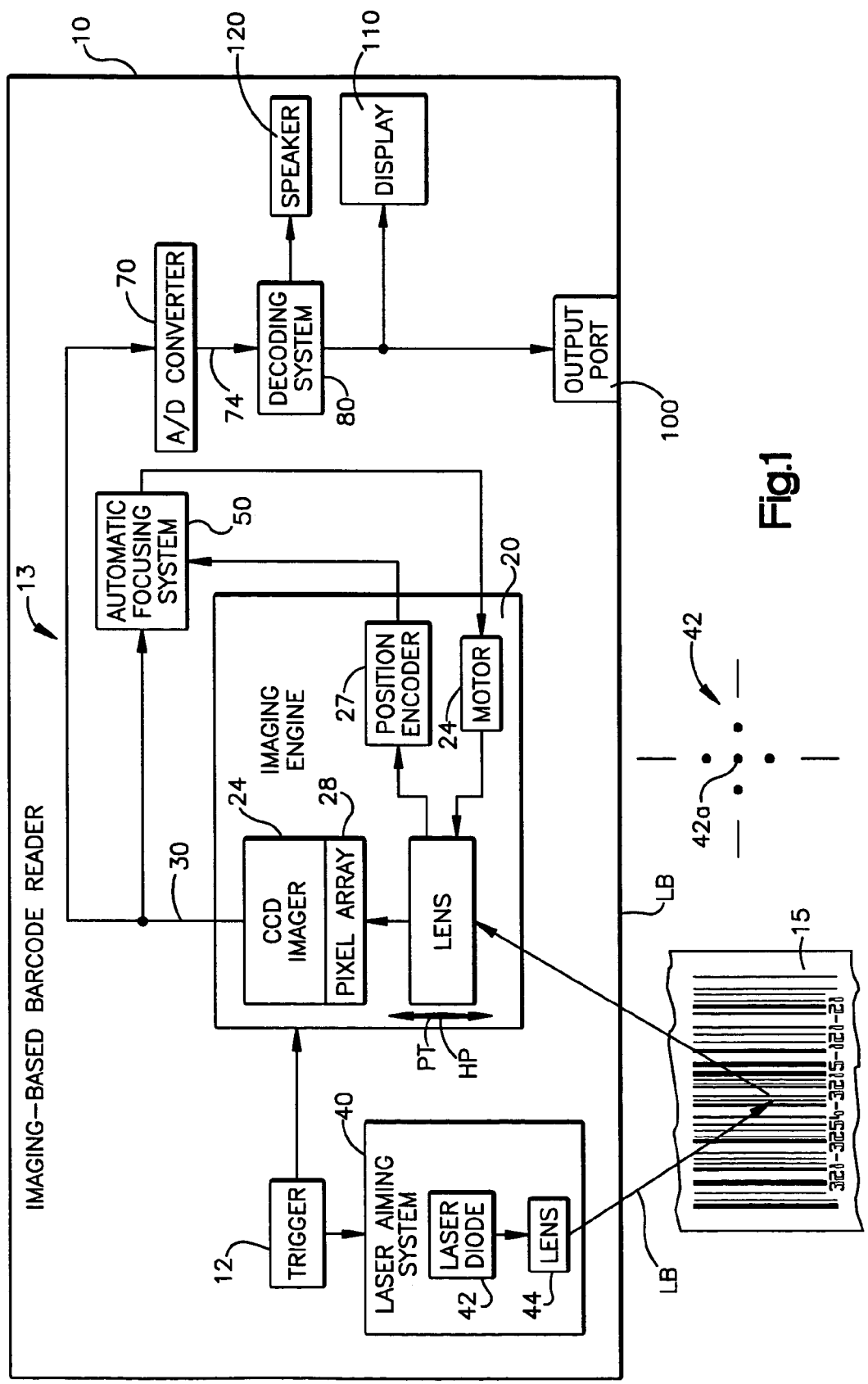
FIG. 1 is a schematic block diagram of an imaging-based bar code reader of the present invention having an automatic focusing system.

An imaging-based bar code reader is shown schematically at 10 in FIG. 1. The bar code reader 10, in addition to imaging and decoding both 1D and 2D bar codes and postal codes, is also capable of capturing images and signatures. In one preferred embodiment of the present invention, the bar code reader 10 is a hand held portable reader that can be carried and used by a user walking or riding through a store, warehouse or plant for reading bar codes for stocking and inventory control purposes.

However, it should be recognized that an automatic focusing system 50 of the present invention, to be explained below, may be advantageously used in connection with any type of imaging-based automatic identification system including, but not limited to, bar code readers, signature imaging acquisition and identification systems, optical character recognition systems, fingerprint identification systems and the like. It is the intent of the present invention to encompass all such imaging-based automatic identification systems.

The bar code reader 10 includes a trigger 12 coupled to the bar code reader circuitry 13 for initiating reading of a target bar code 14 positioned on an object 15 when the trigger 12 is pulled or pressed. The bar code reader 10 includes an imaging system or engine 20 including a focusing lens 22, a CCD imager 24 and a position encoder 29 that provides position information regarding the lens as it moves along its path of travel PT. The focusing lens 22 focuses light reflected from the target bar code 14 onto an array of photosensors or pixels 28 of the CCD imager 24. At predetermined intervals, the pixels of pixel array 28 are read out generating an analog signal 30 representative of an image of whatever is focused by the lens 22 on the pixel array 28, for example, an image of the bar code 14. The analog image signal 30 is then digitized by an analog-to-digital converter 70 and a digitized signal 74 is decoded by decoder circuitry 80. Decoded data 90, representative of the data/information coded in the bar code 14 is then output via a data output port 100 and/or displayed to a user of the reader 10 via a display 110. Upon achieving a good "read" of the bar code 14, that is, the bar code 14 was successfully imaged and decoded, a speaker 120 is activated by the circuitry 13 to indicate to the user that the bar code has been successfully read.

Figure 3:
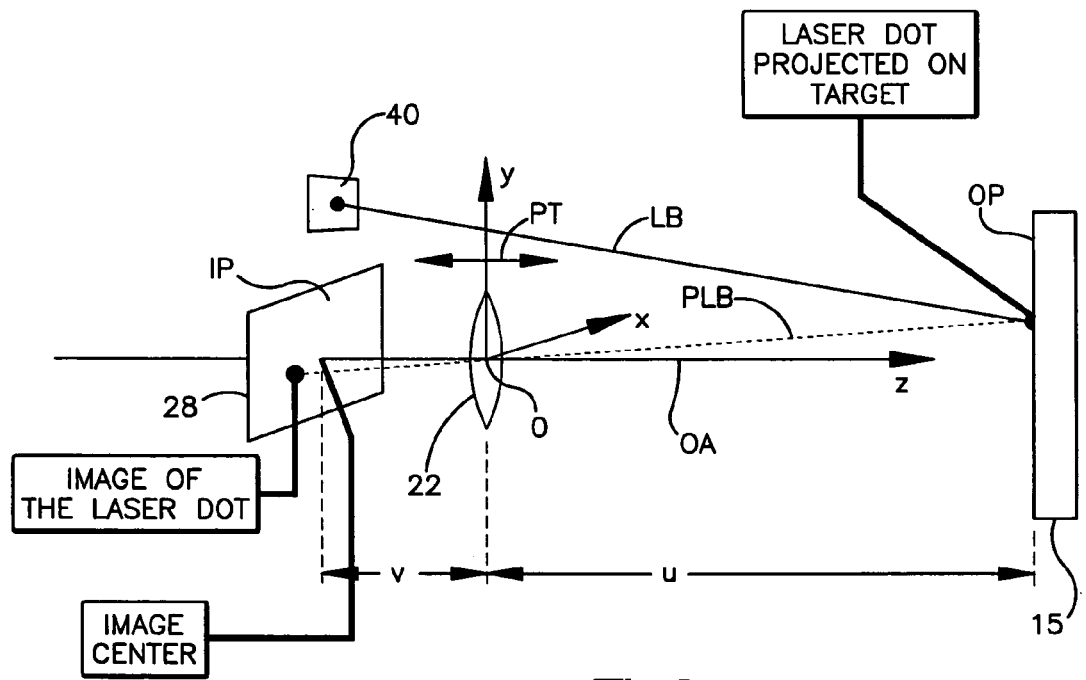
FIG. 3 is schematic diagram of a laser beam apparatus of the bar code reader of FIG. 1 as used to determine range from imaging engine to target object.
Figure 10:
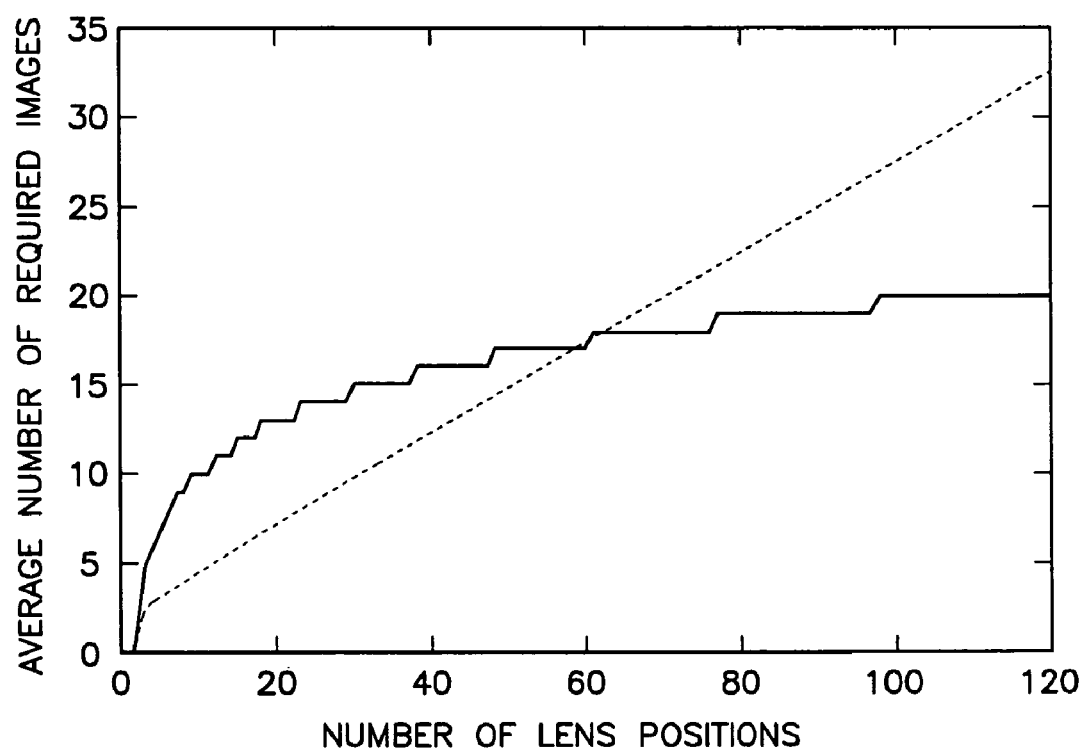
FIG. 10 is a graph comparing the efficiency of the golden section and median position search algorithms.

The focusing lens 22 is driven by a motor 29, such as a piezo motor, along its linear path of travel PT. The lens path of travel PT is along an optical imaging axis OA and orthogonal to a light receiving planar surface of the pixel array 28. It should be recognized that the lines labeled PT in FIGS. 1, 3 and 4 are schematic representations of the path of travel of the lens 22 and the lines merely illustrate the direction of the lens path of travel along the optical axis OA. As will be explained below, the automatic focusing system 50 causes the lens 22 to be moved from a home position HP along the path of travel PT to a position that is suitable for decoding the digitized signal 74 representative of the imaged bar code 14. Moreover, the time required for the automatic focusing system 50 to accomplish the movement of the lens 22 to a suitable position is typically on the order of 20 ms. or less.

The bar code reader 10 further includes an aiming apparatus 40 for generating a visible aiming pattern 42 to aid the user in properly aiming the reader at the target bar code 14. In one preferred embodiment, the aiming apparatus 40 is a laser aiming apparatus. Alternatively, the aiming apparatus 40 may utilize an LED or another source of illumination known to those of skill in the art. The pattern 42 may be a pattern comprising a plurality of dots and/or lines of illumination as shown in FIGS. 1 and 6A or may comprise a single dot or overlapping group of dots of illumination. In one preferred embodiment, the laser aiming apparatus 40 includes a laser diode 42 and a diffractive lens 44.

Figure 2:
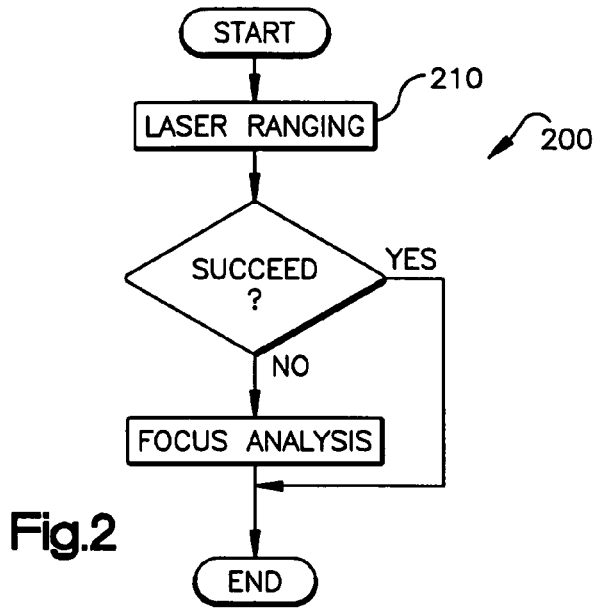
FIG. 2 is a flow chart of the overall functioning of the automatic focusing system.

As shown in the flow chart of FIG. 2 at 200, the automatic focusing system 50 employs a two step process to focus the image on the pixel array 28, that is, to move the lens 22 to a suitable position along its path of travel PT for successfully imaging and decoding the target bar code 14. The first step, shown at 210 in FIG. 3, employed by the automatic focusing system 50 is laser ranging. The laser light emitted by the laser diode 42 to generate the laser aiming pattern 42 travels outwardly toward the target bar code 14. The laser beam impacts the bar code 14 or the object 15 the bar code is affixed to and is reflected back toward the reader where it is focused on the pixel array 28 by the lens 22. Laser ranging utilizes the laser aiming apparatus 40 to determine an object distance u (shown in FIGS. 3 and 4) between a principal plane PP of the lens 22 and the object plane OP, that is, a surface of the target bar code 14, along the optical axis OA. The object distance u is computed using a parallax distance algorithm.

Using geometric relationships, the parallax distance algorithm determines the object distance u. Given that the object distance u has been determined and further given that the focal length f of the lens is known, the image distance v can be computed using the standard lens equation (Thin Lens law) $1/f = 1/u + 1/v$. The image distance v is the distance between the principal plane PP of the lens 22 and the image plane IP, that is, a light receiving surface of the pixel array 28. The automatic focusing system then moves the lens 22 along its path of travel PT to a suitable position such that a satisfactory image of the laser aiming pattern is focused onto the pixel array 28.

If, on the other hand, laser ranging is not successful in determining the distance between the lens 22 and the bar code 14, then the automatic focusing system 50 proceeds to the second step of focus analysis, shown at 220 in FIG. 2, to determine a suitable position for the lens 22 to decode the imaged bar code 14. In focus analysis, multiple frames or images of the target bar code 14 are read out from the pixel array 28 at different lens positions. The images are analyzed for image clarity by the automatic focusing system 50 and a suitable position for the lens 22 is determined. Movement of the lens from the home position HP along its path of travel PT is determined via a search routine or heuristic, to be explained below, which seeks a satisfactory focus position.

Laser Ranging

The laser diode 42 produces the aiming pattern 42 that assists the user in aiming the reader at the target bar code 14. Using the laser light reflected from the bar code 14, the same laser beam pattern 42 can be used to determine the object distance u (FIG. 3) from the pixel array 28 to the target bar code 14. Utilizing a standard lens formula, the object distance u of the target bar code 14 is translated to the image distance required to achieve a focused image of the target bar code 14 on the pixel array 28. This, in turn, determines the desired lens position along its path of travel PT.

In order to estimate the distance u of the lens 22 to the bar code 14, the laser beam projected onto the bar code and an image of the laser pattern reflected from the bar code 14 is projected onto the pixel array 28. Turning to FIG. 3, the z-axis of the reference coordinate system is defined by the optical axis, OA, and the origin O is defined by the intersection of the z-axis with the principal plane of the lens 22. A 3D vector V is represented by:

$$V = v + z\hat{z}, \quad v \cdot \hat{z} = 0,$$

where v is the projection of V on the image plane (that is, the plane of the pixel array 28) and z is the projection on the z-axis.

The laser beam (the line labeled LB in FIG. 2) can be modeled as a 3D line:

$$l = g + \beta z, \qquad (1)$$

where g and $\beta$ are 2D vectors that define the position and direction of the laser beam, respectively. Let $\alpha$ be a 2D vector that represents $P_i$, the projection of the laser dot P on the image plane. According to the law of perspective projection:

$$l = \alpha z, \quad \alpha = f_{bl} v_{pi}, \qquad (2)$$

where $f_{bl}$ is the back focal length and $v_{pi}$ is the 2D coordinate of $P_i$.

Combining equations (1) and (2) and solving for z:

$$z = \frac{g^2}{(\alpha - \beta)g}. \qquad (3)$$

g and $\beta$ can be obtained through calibration (see Section 2.2). Once the laser dot is located in the image, z can be computed using equation (3). Note that the back focal length $f$ does not appear in (3) since $\alpha$ is represented in number of pixels. The object distance u of the principal plane PP of the lens 22 to the target bar code 14 is, therefore, u = z.

Calibration of Laser Beam

To calibrate the laser beam LB, from equations (1) and (2):

$$(\alpha - \beta)z = g. \qquad (4)$$

Rewriting equation (4):

$$[g \ \beta] \cdot \begin{bmatrix} 1 \\ z \end{bmatrix} = \alpha z. \qquad (5)$$

There are two unknowns to calibrate, g and $\beta$. Theoretically, only two measurements are needed to get g and $\beta$. However, in order to minimize the measurement error, multiple measurements are collected and least squares is used to get the optimal values.

Assume n measurements, the n inputs can be written as:

$$Z \cdot v = C, \qquad (6)$$

where $$Z = \begin{bmatrix} 1 & z_1 \\ 1 & z_2 \\ \vdots & \vdots \\ 1 & z_n \end{bmatrix}, \quad v = \begin{bmatrix} g \\ \beta \end{bmatrix}, \quad C = \begin{bmatrix} \alpha_1 z_1 \\ \alpha_2 z_2 \\ \vdots \\ \alpha_n z_n \end{bmatrix}.$$

Define an error vector E as $E = Z \cdot v - C$, since $Z \cdot v$ is the laser spot defined by the line equation of the laser beam LB, and C is the same point but derived from the line equation from the 2D projection in the image. Minimizing $E^2$ yields $$Z'(Z \cdot v - C) = 0. \qquad (7)$$

Expanding equation (7):

$$\begin{bmatrix} n & \sum_{i=1}^{n} z_i \\ \sum_{i=1}^{n} z_i & \sum_{i=1}^{n} z_i^2 \end{bmatrix} \cdot \begin{bmatrix} g \\ \beta \end{bmatrix} = \begin{bmatrix} \sum_{i=1}^{n} \alpha_i z_i \\ \sum_{i=1}^{n} \alpha_i z_i^2 \end{bmatrix}. \qquad (8)$$

Multiplying both sides with the inverse of the coefficient matrix:

$$\begin{bmatrix} g \\ \beta \end{bmatrix} = \begin{bmatrix} n & \sum_{i=1}^{n} z_i \\ \sum_{i=1}^{n} z_i & \sum_{i=1}^{n} z_i^2 \end{bmatrix}^{-1} \cdot \begin{bmatrix} \sum_{i=1}^{n} \alpha_i z_i \\ \sum_{i=1}^{n} \alpha_i z_i^2 \end{bmatrix}. \qquad (9)$$

In the perspective projection model, z-bias needs to be taken care of. Dividing z on both sides of equation (5) results in:

$$[g \ \beta] \cdot \begin{bmatrix} \frac{1}{z} \\ 1 \end{bmatrix} = \alpha, \qquad (10)$$

and consequently equation (6) becomes $$\begin{bmatrix} g \\ \beta \end{bmatrix} = \begin{bmatrix} \sum_{i=1}^{n} \frac{1}{z_i^2} & \sum_{i=1}^{n} \frac{1}{z_i} \\ \sum_{i=1}^{n} \frac{1}{z_i} & n \end{bmatrix}^{-1} \cdot \begin{bmatrix} \sum_{i=1}^{n} \frac{\alpha_i}{z_i} \\ \sum_{i=1}^{n} \alpha_i \end{bmatrix}. \qquad (11)$$

Thus, g and β have been solved. Notice that the solution of g and β contains $f_{bl}$, the back focal length. When computing z using equation (3), $f_{bl}$ will be cancelled out. Thus in practice, the coordinates in number of pixels are represented directly.

The auto focus system 50 calibrates g and β relative to a reference position or home position HP of the lens 22 and magnification is corrected in the calculation.

Precision of Laser Ranging

Assuming g and β are constants, differentiating both sides of equation (4) results $$\frac{dz}{z} = -\frac{z \cdot g}{g^2} d\alpha. \quad (12)$$

This suggests that the relative precision of z is linearly proportional to dα. However there are errors, either in calibration of g and β, or caused by other systematic reasons. Taking g and β as variables results in:

$$\frac{dz}{z} = \frac{g \cdot dg}{g^2} - \frac{z \cdot g \cdot d\alpha}{g^2} + \frac{z \cdot g \cdot d\beta}{g^2} \quad (13)$$

The goal of the auto focusing system 50 is to bring the image into focus. The depth of field of the imaging system 20 permits imprecision in the range measurement. The autofocusing system 50 is, therefore, interested in the image space in which the error of the ranging (that is, the error in determining u) is transformed into the error in image distance v, which in turn is reflected as the blur circle BC in the image. FIG. 4 illustrates the geometric relationship between radius of the blur circle BC and the offset in image distance. After the object distance u is computed, given the focal length f, the image distance v is computed. Given that the lens 22 is in its home position HP along the path of travel PT, it is unlikely that the actual distance (shown as v' in FIG. 4) between the principal plane PP of the lens 22 and the image plane IP (surface of the pixel array 28) is equal to the image distance v. Thus, the image of the laser dot projected on the pixel array 28 is an unfocused blur circle BC. The automatic focusing system 50 then must move the lens 22 along its path of travel so that a sharp image is focused on the pixel array 28. However, in accordance with the Thin Lens law (1/f=1/u+1/v) note that as the lens 22 moves along the path of travel PT, the object distance u and image distance v both change.

The diffraction blur is not considered by the auto focusing system 50 since size of the error disk caused by diffraction is sub-pixel and the pixel array 28 is assumed to be a mega-pixel configuration. The radius of the blur circle BC is:

$$R = \frac{D}{2}\left(\frac{v-v'}{v}\right) = \frac{D}{2} \cdot \frac{\delta v}{v} \quad (14)$$

The Thin Lens law provides:

$$\frac{1}{u} + \frac{1}{v} = \frac{1}{f}. \quad (15)$$

Differentiating both sides of equation (15) results in:

$$\frac{du}{u^2} = -\frac{dv}{v^2}. \quad (16)$$

In practice, there are other error sources that will impact the focusing results, for example the inherent error of the piezo motor 29, i.e., the difference between the desired position the automatic focusing system 50 wants the motor to move the lens 22 to and the actual position the motor moves the lens to. Taking this into consideration, equation (14) can be rewritten:

$$R = \frac{D}{2} \cdot \left(-\frac{v}{u} \cdot \frac{\delta u}{u} + \frac{\delta v_m}{v}\right), \quad (17)$$

where $\delta v_m$ is the average motor error.

Substituting equation (13) into (17) results in:

$$R = \frac{D}{2} \cdot \left(-\frac{v-f}{f} \cdot \frac{g \cdot dg}{g^2} + \frac{v \cdot g \cdot d\alpha}{g^2} - \frac{v \cdot g \cdot d\beta}{g^2} + \frac{\delta v_m}{v}\right). \quad (18)$$

g and β are calibrated relative to a camera coordinate system. In the auto focus system 50 where the lens 22 moves, i.e. the origin of the coordinate system moves, the offset of the origin dominates the errors of g and β. The lens moves along the z-axis (that is, along optical axis OA) only. Thus, $$\delta g = g + \beta \cdot \delta z - g = \beta \cdot \delta z \quad (19)$$

Since the lens 22 moves along the z-axis only, dβ is 0. Thus, equation (18) simplifies to:

$$R = \frac{D}{2}\left(-\frac{v-f}{f} \cdot \frac{g \cdot \beta \cdot (k\delta z)}{g^2} + \frac{v \cdot g \cdot d\alpha}{g^2} + \frac{\delta v_m}{v}\right). \quad (20)$$

In equation (18), the first part in the parenthesis is of the same order as the other two parts and thus cannot be ignored. A position encoder 27 (FIG. 1) installed in the imaging engine 20, system provides real-time readings of the lens position along its path of travel PT relative to a home position HP, which can be calibrated when the imaging system 20 is assembled. Thus, the error can be corrected and equation (20) can be simplified to the following:

$$R = \frac{D}{2} \cdot \left(\frac{v \cdot g \cdot d\alpha}{g^2} + \frac{\delta v_m}{v}\right). \quad (21)$$

The automatic focusing system 50 uses equation (21) to estimate the pixel location accuracy needed to meet the desired focusing requirement, or vise versa. By increasing aperture size, focal length, or reducing pixel size, offset of the laser beam, da will decrease, i.e, higher accuracy in pixel location will be needed.

Locating the Aiming Pattern 42

The essence of laser ranging is locating the center of the aiming pattern 42. Considering the image of the laser beam is highly blurred when the lens 22 is out of focus, it is necessary for the automatic focusing system 50 to identify a region of interest (ROI) of the laser spot, i.e., the region where the aiming pattern 42 lies and its blurred peripheral, and compute the center of mass (COM):

$$X = \frac{\sum_i i * I(i)}{\sum_i I(i)}, \quad (22)$$

where i indicates the x coordinate of the pixels within the ROI and I(i) their corresponding intensity. The same applies to the Y coordinate.

A detailed theoretical analysis of the COM computation is presented in an article entitled "Novel Denoising Algorithm for Obtaining a Superresolved Position Estimation" by Z. Zalevsky, et al., *Opt. Eng.*, 41(6), pp. 1350-1357, June 2002. The foregoing article is incorporated in its entirety by reference herein. However, given that the imaging engine 20 is used as an imager, the background is likely to overlap with high frequency patterns and thus become the dominant source of noise, the quantization error and shot noise can be ignored.

Note that the magnification changes with movement of the lens 22 and this effect cannot be ignored. A projection line of the laser beam is normalized according to the real-time lens position by the automatic focusing system 50, and the final coordinates of the aiming pattern center 42a are normalized with respect to magnification.

The process used by the automatic focusing system 50 for locating the center of the aiming pattern is illustrated in FIG. 5. The aiming pattern is highly blurred. The line PLB indicates the pre-computed projection of the laser beam on the image plane (pixel array 28) with the magnification corrected. Pixels with intensity considered "bright" are in light color. The COM of the bright region is marked COM. The pixel marked CCOM is the COM after magnification is corrected. Shape analysis can be applied to filter noise. A simpler alternative is to repeat the COM computation until all highlighted pixels are within a reasonable distance of the center.

The heart of the problem is locating the ROI. The automatic focusing system 50 searches along the laser projection line PLB to determine the threshold of "bright" pixels. To reduce the search time, the automatic focusing system 50 employs a sampling and search algorithm that samples every other pixel both in row and in column. Meanwhile, the automatic focusing system 50 accumulates statistics in blocks so that it can quickly locate the blocks containing those bright pixels after the threshold is determined, and thus avoid a second pass of the search. The statistics accumulated are the maximum intensity of every block. After the brightness threshold is determined from the histogram, the algorithm used by the automatic focusing system 50 goes through the blocks and identifies those with maximum intensity beyond the threshold.

The automatic focusing system algorithm chooses the width of the block to be the maximum possible width of the aiming pattern 42 (under blur), and the height of the block to be half of the width. Thus, the aiming pattern 42 can cover at most three consecutive blocks. This can be used to eliminate stochastic bright spots in the scene. If the automatic focusing system 50 finds more than 3 blocks with maximum intensity greater than the threshold, or 3 such blocks that are not next to each other, the algorithm halts because multiple bright spots are detected in the scene. Once the blocks that contain the aiming pattern 42 are correctly identified, the COM can be computed. The subsampling rate and block size can be adjusted to achieve the best performance of the search algorithm. Pseudo code of the laser ranging algorithm used by the automatic focusing system 50 is provided at 300 in FIG. 7.

To further improve the accuracy and robustness of the laser ranging, the laser pattern 42 should consist of multiple dots. This does not necessarily multiply the processing time. Assume the geometric relationship between the dots is known (which can be obtained from either the design of the diffractive optical element (DOE) 44 or calibration) In the case of two dots, one dot would be searched for using the algorithm discussed above, and the location of the other dot would be predicted using the coordinates of the first dot and their geometric relationship. The automatic focusing system 50 would then verify a dot exists at the predicted location in the image. Thus, the second dot is used for verification of the correct identification of the first dot.

Design of the Aiming Pattern 42

The main application of the imager 20 is a barcode scanner or reader; thus, it must operate in a broad range of environments, both dark and bright, indoors and outdoors. In order to use the laser 40 as a ranging device, the reflected laser pattern must be visible in the image; thus, it would be preferable for the laser intensity to be as strong as possible, especially under high ambient light conditions. However, it is also desirable to minimize the laser power to rate the reader 10 in the best laser safety class.

In order for the laser to be visible, it is required that:

$$\frac{E_l}{\pi \left(\frac{w}{2}\right)^2} \geq k \cdot E_s, \quad (23)$$

where $E_l$ is the laser energy, $E_s$ is the ambient light energy, k is a coefficient describing the visibility, and w is the diameter of the laser spot. The term w can be computed by:

$$w = w_0 \sqrt{1 + \left(\frac{\lambda z}{\pi w_0^2}\right)^2}, \quad (24)$$

where $w_0$ is the diameter at the laser waste, $\lambda$ is the wavelength, and z is the distance to the laser origin.

Substituting w into equation (23) with equation (24) and considering only the equality, the following equation results:

$$w_0^4 - \frac{E_l \cdot w_0^2}{k \cdot E_s \cdot \frac{\pi}{4}} + \frac{\lambda^2 z^2}{\pi^2} = 0. \quad (25)$$

In order for equation (25) to have solutions, it is required that:

$$\Delta = \frac{E_l^2}{\left(k \cdot E_s \cdot \frac{\pi}{4}\right)^2} - \frac{4\lambda^2 z^2}{\pi^2} \geq 0. \quad (26)$$

Solving for $E_l$ results in:

$$E_l \geq \frac{k\lambda z E_s}{2}. \quad (27)$$

This gives the lower bound of $E_l$, given $E_s$, k, and the desired working range z. Considering the defocus in the imaging system 20, the $E_l$ estimated here should be the worst-case scenario, where the original laser power $E_0$ (without blurring) is $$E_l = \frac{E_o}{\pi R_{max}^2}.$$

$R_{max}$ is the radius of the blur circle when the lens is at the maximum offset from the optimal focus position, which can be estimated using equation (14).

Class 2 laser classification requires:

$$N \cdot E_l \cdot t < 7 \times 10^{-4} t^{0.75} n^{-0.25}, \quad (28)$$

where N is the number of laser dots that are projected onto a circular area of 7 millimeters (mm.) radius from a distance of 100 mm., t is the exposure time, and n is the number of pulses during the duration of 250 ms. From equation (28):

$$E_l < \frac{7 \times 10^{-4} t^{-0.25} n^{-0.25}}{N}. \quad (29)$$

This gives the upper bound of $E_l$, given the exposure time, blinking rate and number of laser dots.

Designing the Laser Pattern 42

When designing a laser pattern both for aiming and for ranging, all of the foregoing need to be taken into consideration. To reduce the interference of the background, it is preferred that the pattern 42 be a highly bright circum-symmetric shape. The size of the pattern should be as small as possible to minimize the search area. Since the pixel intensity is used as the weight in the COM computation, ideally the intensity distribution should have a peak in the center and decrease gradually.

To reduce the impact of defocus and contrast reversal, laser dots should be positioned as dense as possible if multiple dots are used in the center of the aiming pattern. A single dot or circular speckle may not be ideal, since the laser is also for aiming purposes and a DOE is used to project a user-friendly pattern. The center of the pattern should be isolated from surrounding dots to leave a "quiet zone", so that the surrounding dots will not confuse the laser ranging procedure. The size of the quiet zone should be larger than the size of the center of the pattern under maximum defocus, which can be estimated by equation (14).

The peripheral patterns should not overlap the projection line of the center dot. In order to reduce the image window size to be read out, the aiming laser 42 should be positioned such that its projection line is the shortest, that is, parallel to the Y-axis (FIG. 2). A sample aiming pattern is shown on the left in FIG. 6. The dashed line PL indicates the projection line. As discussed above, use of multiple dots can improve both the accuracy and the robustness of ranging. A sample aiming pattern that has multiple dots is shown on the right in FIG. 6. When ranging, the automatic focusing system algorithm searches for the left dot and uses the right dot for verification purposes.

The upper and lower bounds indicated in equations (19) and (21) are considered when choosing the laser power, exposure time, blinking rate, etc., to meet requirements of both laser visibility and safety.

In the cases with extreme high ambient light such as direct sunlight, it may be difficult to meet both equations (19) and (20) with a single laser intensity. An alternative is to use a laser with variable intensity controlled by a specially designed circuit.

Focus Analysis

If the laser ranging is unsuccessful, the automatic focusing system 50 resorts to step two, namely, focus analysis to determine a suitable position of the lens 22 along its path of travel PT that will result in a decodable image of the target bar code 14 to be projected upon the pixel array 28.

In the computer vision literature, several techniques have been proposed to recover the depth of the scene, for example stereo, motion, depth from focus/defocus, depth from zoom, etc. Taking into account the single lens opto-mechanical system of the imaging system 20, it leads naturally to a solution that utilizes the defocus property.

Techniques dealing with defocus of images fall into two categories: depth from focus (DFF) and depth from defocus (DFD). The DFF method takes a sequence of images and determines the optimal focus position based on some monotonic focus measure functions. The DFD method takes two defocused images and determines the depth by estimating the size of the blurry circle. In general, DFF searches for the optimal solution while DFD works on fewer images and trades the mechanical movements of camera parts with CPU cycles. Since the hardware design of the imager guarantees a short readout time (window support in CMOS imager) and a high speed mechanical movement, plus the amount of computation involved in DFD may override its advantage of fewer images, finding optimal focus position via evaluating focus measures at different lens positions gives a better solution.

Focus Measures

Several focus measures have been considered including gray level variance, energy of gradient (gradient squared), energy of Laplacian, and integral of absolute value of gradient.

While variance, energy of gradient and energy of Laplacian are all sound focus measures, Laplacian is not selected because of its higher computation cost. The energy of gradient measure has sharper peak than the variance measure, and thus is less subjective to noise. On the other hand, the variance measure is less expensive to compute.

The feasibility of using integral of absolute value of gradient as a focus measure was also investigated. It is of interest because certain processors provide hardware support to compute such kind of statistics, for example the Motorola Dragonball MC9328MXL processor provides sum of absolute difference (SOAD) in hardware. As suggested in the literature, integral of absolute value of gradient is not a mathematically sound focus measure. The measure fails when the target's gradient distribution satisfies a probability distribution, for instance, a step edge or a ramp. In the present case, the imaging system's targets will generally be bar codes, and a single step edge or a ramp is not very appealing for picture taking. Thus, it appears safe to use integral of absolute value of gradient as a focus measure.

Searching for the Optimal Focus Position

Focus measures are unimodal over the focus range. The automatic focusing system 50 seeks to find the lens' optimal focus position, i.e., the peak.

Golden Section Search

Golden section search can be used to locate the maximum or minimum over an interval if the function is unimodal on that interval. At 400, FIG. 8 provides a code listing for golden section search (searching for the maximum):

$\alpha_0$, $b_0$ defines the interval; $\tau$ is the proportion ratio, when set to the golden ratio $$\frac{3-\sqrt{5}}{2},$$

the algorithm has an optimal interval reduction rate; $f$ is the function; tol defines the tolerance of the error.

The algorithm halts when $$k \geq \frac{\log(tol)}{\log(\tau)} \approx ceil\left(4.78 \log\left(\frac{1}{tol}\right)\right) \quad (30)$$

In the present case, $\alpha_0$, $b_0$ defines the two ends of the lens path of travel range; $f$ is the focus measure function. A set of lens positions is pre-calculated, which best covers the whole working range. The depth of focus of those lens positions overlap with each other. Let the number of those positions be n, then choose tol to be 1/n. Hence, the number of images acquired and evaluated is:

$$NI_g = 2k \approx ceil(9.56 \log(n)) \quad (31)$$

Median Position Search

Another proposed search method is called median position search. The search starts at the mid point of the range and randomly walks in one direction. If the search routine finds that the values are decreasing, i.e., the function value is decreasing in the direction, the wrong direction has been chosen. The search routine then switches the search direction until it finds the value is going down again. The maximum value encountered corresponds to the peak. At 500, FIG. 9 provides a code listing for the median position search:

lRange and rRange defines the left and right boundary of the lens moving range, n is the number of pre-calculated lens positions.

The average number of iterations for median position search is:

$$NI_m = \begin{cases} \frac{k^2 + 6k}{2k+1} & n = 2k+1 \\ \frac{2k^2 + 10k - 5}{4k} & n = 2k \end{cases} \quad (32)$$

FIG. 9 is an empirical comparison of the golden section and median position search routines. The horizontal axis is a measure of number of lens positions, while the vertical axis is the average number of required images to obtain a maximum value (i.e., best image focus position). From the plot in FIG. 9, when the number of lens position is less than 63, median position search takes fewer images than golden section search routine to find the maximum, that is, the best focus position of the lens 22 along its path of travel PT. Beyond that, golden section search routine requires fewer images. In the imaging system 20 of the present invention, the required number of lens positions to find the maximum or best focus position is approximately 9-12. The advantage of median position search routine is obvious. The automatic focusing system 50 preferably uses the median position search routine to determine a suitable lens position if laser ranging fails.

One possible alternative is for the automatic focusing system 50 to apply median position search routine at larger step first and then optimize locally with smaller steps.

Side Lobe Effects

Low pass filtering is suggested in the literature to remove the side lobe effects. Additionally, low pass filtering also helps removing noise in the image. The imaging system 20 utilizes a rectangular low pass filter, which averages pixel values over neighboring pixels. It is more computationally economic than Gaussian without compromising performance, as observed in experiments.

Figure 11A:
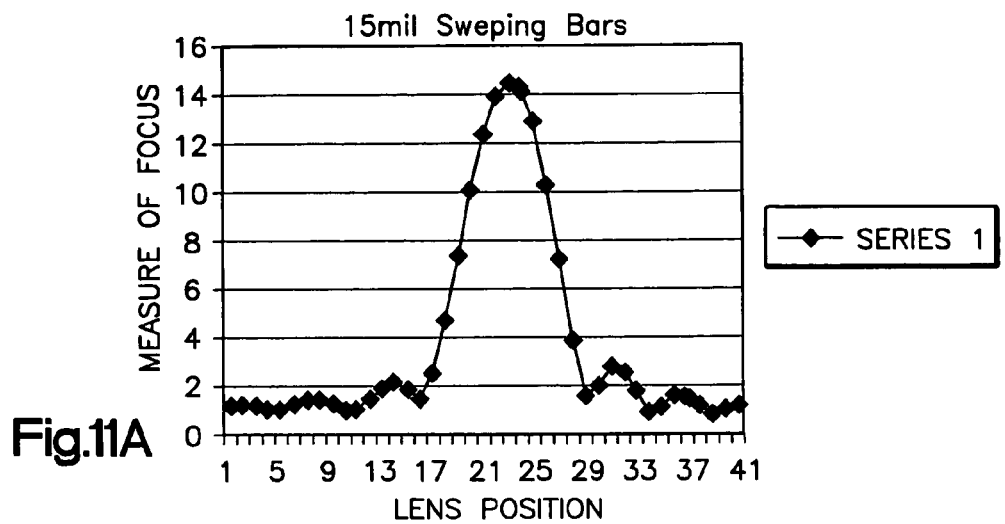
FIG. 11 is a series of three graphs for different bar codes showing focus measure side lobes.
Figure 11B:
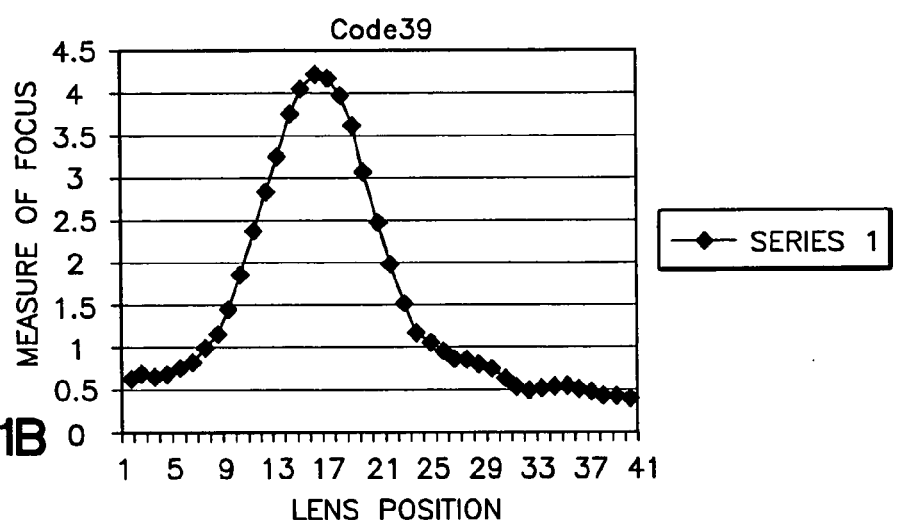
Figure 11C:
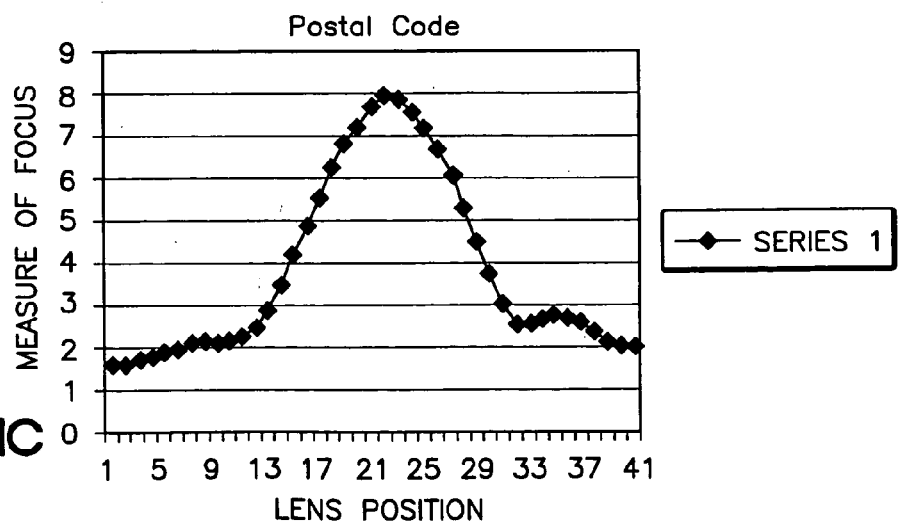

However, even with a low pass filter, side lobes cannot be completely removed, especially when there are only a very few number of frequencies in the image. The graph depicted in FIG. 11A shows the focus measure plot of 15 mil sweeping bar, which has a single frequency. In FIGS. 11A, 11B, 11C, the horizontal axis represents lens position along the path of travel PT and the vertical axis is a measure of focus (image sharpness), wherein the higher the number, the sharper the focus. For picture taking, the presence of side lobes is not an important issue, since there are usually abundant frequencies in the imaged scene. However for barcodes, this cannot be ignored. FIG. 11B and 11C show the focus measure plots for code 39 bar code and postal code.

In order to prevent being trapped in local maximum, the automatic focusing system algorithm samples two more images. Assuming that the peak does exist in the range in which the lens 22 can be moved, the images should be taken at the mid points of each side of the peak. Focus measure is computed at the two mid points and compared with the value at the peak position to be verified. If the peak value is higher than both the mid point values, the algorithm verifies that the peak is global maximum. If not, it is local maximum. The algorithm starts the new search from the mid point with higher focus measure value.

Automatic Focusing System Combined Solution

The automatic focusing system 50 initially attempts to determine a suitable lens position via laser ranging using the laser aiming pattern system 40. While laser ranging is fast and accurate within the desired working range, it has certain limitations. As the working environment varies, the aiming pattern may not be visible all the time, which is occluded by background patterns, or dimmed by high ambient light or absorbing material, and thus compromises the overall reliability of the system.

If and when laser ranging fails, the automatic focusing system 50 utilizes focus analysis and the median position search routine as described above. The amount of time required to acquire multiple images for focus analysis does not cause serious delay on the overall performance. By choosing a reasonable size of readout window, the image readout time can be minimized. Furthermore, focus analysis is invoked as a "backup plan" only when the laser ranging fails, which is usually under extreme high ambient light. Thus only very short period of integration time is needed to get a well-illuminated image.

Since focus analysis involves multiple images, pipelining motor movements, image readout and computation of focus measures will further reducing the total processing time.

Focus analysis fails when the blurriness of the scene does not change, i.e. the scene is uniform. This may not constitute a serious problem in the cases where the target is various kinds of barcodes, which provides rich textures. A moving focus window, which samples at different areas within the image, may also help solve the problem.

A "side product" of the auto focusing system 50 is that data is collected as to how far users of the reader 10 aim at target bar codes, either from laser ranging which tells the distance directly, or from focus analysis, in which the object distance can be computed from determined lens position. Moreover, the barcode decoder 80 indicates what kind of barcode has been scanned. By accumulating data regarding the bar code type and the reading distance, behavior of users can effectively be modeled. This can be further used as a feedback to optimize the automatic focusing system 50.

Experimental Results

A prototype of the auto focus system 50 was built and implemented with the combined two step process of laser ranging and focus analysis, as described above. In order to correctly evaluate the performance of the auto focusing techniques, a reference method was needed to indicate where the exact focus position is. By observing that the focus measure plot is symmetric, relative to its peak, an algorithm was developed using such symmetry. The basic idea of the algorithm is as follows: move the motor in small steps (~5 um.) in the neighborhood of the position previously determined by the auto focus algorithm and record the focus measure value.

Any sound focus measure can be used. In the experiment, the sum of gradient squared with Gaussian low pass filter was used. The lens position with maximum gradient (difference with neighboring position) at one side of the peak was searched for, and then finding the matching position (which yields the same focus measure value) at the other side of the peak, by interpolation. The midpoint of the two positions gives the exact peak location. The standard deviation of the described algorithm is <3 um., which was believed to be good enough to be used as a reference for testing purposes.

Notice that in practice, diffraction distorts the symmetry and thus the real optimal lens position is not at the point computed using the above algorithm. However, since the imaging system under discussion uses 1.8 mm. aperture and such shift caused by diffraction is small, which is estimated to be ~1 um., and, thus, can be ignored.

Test Results

A series of tests to evaluate the performance of laser ranging and focus analysis for the auto focusing system 50 were completed with the prototype. The configuration of the prototype is as follows: focal length 4.8 mm., aperture size 1.8 mm., pixel size 4.5 um., laser aiming pattern offset ~5 mm. The minimum depth of focus is 24 um., assuming 1 pixel blur. The reference home position HP of the piezo motor is 5.695 mm.

Laser Ranging Results

Tables 1-5 contain the experimental results of the laser ranging. Laser ranging was used to focus targets positioned at 2", 5", 9" and 12" respectively. To account for the impact of defocus, the lens 22 was driven to different starting positions, varying from 0-900 um. away (toward sensor plane) from the home position. During the experiments, it was observed that starting from positions further away from the optimal lens position produces larger deviations. Considering the application for the auto focusing here is barcode scanning, choosing a reasonable starting position range can be done to reduce the impact of blur. In this example, 600-900 um. was chosen, which corresponds to object distances from 3.3" to infinity.

A 10 mil PDF417 barcode was used as the subject in the experiment. For comparison purposes, experiments were repeated using a blank sheet of paper as background. The aiming pattern used is a 0.2 mw pointing laser dot. The results are shown in Tables 1 and 2. Notice that the standard deviation is larger than the blank paper case, which reflects the diffraction of the barcode to the laser. The reference home position HP is the lens position when the piezo motor 29 is initialized, which is used in calibration and magnification normalization as a reference.

TABLE 1

Laser ranging on white background

| Object Distance (inch) | 2 | 5 | 9 | 12 | Total |
|---|---|---|---|---|---|
| AVG (um) | −1.57 | 6.48 | 12.05 | −0.25 | 6.55 |
| STDEV (um) | 1.86 | 3.06 | 5.65 | 2.68 | 4.18 |

TABLE 2

Laser ranging on PDF417

| Object Distance (inch) | 2 | 5 | 9 | 12 | Total |
|---|---|---|---|---|---|
| AVG (um) | 3.09 | 10.16 | −5.82 | −2.59 | −3.89 |
| STDEV (um) | 2.71 | 4.07 | 4.16 | 4.07 | 5.92 |

Intrinsic camera parameters used in the experiments were not calibrated. Shift of image center and sensor plane tilt can both cause errors of the ranging. Calibration errors of the laser offset, motor home position, are sources of error too. Systematic errors can be removed by a good calibration.

Focus Analysis Test Results

Table 3 lists the test results of different focus measures. In the experiment, a 50 um. step was used first to find the approximate focus location, and then 10 um step were used to optimize it. The subject is 10 mil PDF417.

TABLE 3

Focus Analysis Experiment Results

| Focus Measure | Variance | Variance | Variance | Gradient | Gradient | Gradient | Gradient | Gradient² | Gradient² |
|---|---|---|---|---|---|---|---|---|---|
| LPF | Gaussian | Rectangle | None | Gaussian | Rectangle | None | Gaussian | Rectangle | None |
| AVG (um) | 6.79 | 11.03 | 2.39 | −1.26 | −1.07 | −2.56 | −4.16 | −3.54 | −8.46 |
| STDEV (um) | 8.13 | 9.38 | 8.87 | 8.09 | 7.46 | 6.84 | 6.76 | 4.81 | 3.25 |

Compatible with the theoretic analysis, gradient squared gives the best performance, in terms of smaller deviation. The benefit of low pass filter is not obvious here. Main source of errors are sensor noise and errors in motor movements.

Interpreting the Test Results in the Context of Bar Code Reading

Compared to the pico configuration used in the experiments, the mega-pixel imager 20 of the present invention will maintain similar F-number, but with larger aperture and longer focal length, i.e., the system is scaled up. To understand the implications of mega-pixel configuration, laser ranging and focus analysis have to be discussed separately, since these two methods are inherently different in the sense that laser ranging works in the object space, while focus analysis in the image space.

In the case of laser ranging, the deviation in image distance is translated into object distance since its deviation in the object space does not change. The conversion is listed in Table 4. By plotting the shift of the "blur curve" in the mega-pixel optics model, it can be checked to see if the accuracy of the auto focus system 50 meets the requirements of barcode reading. From the plots, it was determined that the accuracy of laser ranging satisfies the barcode reading requirement, except for reading 5 mil PDF at 9" (for 9", the limit is 6.6 mil).

TABLE 4

Laser ranging in mega-pixel configuration

| Object Distance (inch) | 2 | 5 | 9 | 12 |
|---|---|---|---|---|
| STDEV (σ) in Object Space (mm) | 0.24 | 2.55 | 8.75 | 15.39 |
| 3σ (inch) | 0.03 | 0.30 | 1.03 | 1.82 |

In the case of focus analysis, it was assumed the deviation in the image space remains the same and translate it into deviation in object space under mega-pixel configuration. Its corresponding deviation in object space is remapped to the mega-pixel configuration, using equation (16). The conversion result is listed in Table 5.

TABLE 5

Focus Measure in mega-pixel configuration

| Object Distance (inch) | 5 | 9 | 12 |
|---|---|---|---|
| STDEV (σ) in Object Space (mm) | 0.94 | 2.51 | 5.20 |
| 3σ (inch) | 0.11 | 0.30 | 0.61 |

Magnification normalization and brightness normalization were not applied in this experiment. In our configuration, the magnification can be ignored for areas near image center (the focus window is (270, 220) to (370, 260)). If the focus window is positioned in locations far from the center, it needs to be normalized first. The brightness normalization is not necessary either since the scene is well controlled. However, if the working environment is known to be changing frequently, brightness normalization is necessary, otherwise large discrepancies will occur.

In summation, the experimental results showed good performance of both laser ranging and focus analysis of the automatic focusing system that will satisfy requirements for effective bar code reading.

While the present invention has been described with a degree of particularity, it is the intent that the invention includes all modifications and alterations from the disclosed design falling with the spirit or scope of the appended claims.

We claim:

1. An automatic identification system comprising:
    a) an aiming apparatus generating a beam to aid in aiming the system at a target object when the system is actuated;
    b) an imaging system including a pixel array, a focusing lens to focus an image of the target object onto the pixel array, the lens movable along a path of travel; and
    d) an automatic focusing system operating to move the lens along the path of travel to a position suitable for properly focusing an image of the target object onto the pixel array, the automatic focusing system:
        1) analyzing an image of the beam reflected from the target object and projected onto the pixel array by the lens and employing a distance algorithm to determine a distance between the imaging system and the target object;
        2) if the distance between the imaging system and the target object is determined, moving the lens along its path of travel to a suitable position for properly focusing the target object onto the pixel array; and
        3) if the distance between the imaging system and the target object is not determined, using a search routine and moving the lens along its path of travel in accordance with the search routine, analyzing images of the target object at different lens positions as the lens is moved along its path of travel and stopping the movement of the lens when a suitable lens position is found.

2. The automatic identification system of claim 1 wherein the aiming apparatus is a laser aiming apparatus and the beam is a laser beam pattern.

3. The automatic identification system of claim 2 wherein the laser aiming apparatus includes a laser diode and a diffractive optical element to project the laser beam pattern on the target object.

4. The automatic identification system of claim 2 wherein the laser beam pattern includes a plurality of spaced apart dots and the distance algorithm uses first and a second spaced apart dots to verify that the aiming pattern has been properly located in the image projected onto the pixel array, wherein upon locating the first dot in the image, the location of the second dot is predicted using coordinates of the first dot and the geometric relationship between the first and second dots, then locating the second dot and comparing its location to predicted location of the second dot.

5. The automatic identification system of claim 1 wherein the automatic identification system is a bar code reader and the target object is a bar code to be imaged and decoded.

6. The automatic identification system of claim 1 wherein the lens is moved along its path of travel by a piezo motor.

7. The automatic identification system of claim 1 wherein the distance algorithm is a parallax distance algorithm based on the parallax or offset between the beam and an imaging axis.

8. The automatic identification system of claim 1 wherein the analysis of images of the target object at different lens positions utilizes a depth from focus method.

9. The automatic identification system of claim 1 wherein the search routine used in moving the lens to different lens positions is median position search routine.

10. The automatic identification system of claim 1 wherein the imaging system includes a CCD imager.

11. The automatic identification system of claim 1 wherein the imaging system includes a CMOS imager.

12. An automatic imaging system for an automatic identification system having an aiming apparatus generating a beam pattern to aid in aiming the system at a target object when the system is actuated and an imaging system including a pixel array, a focusing lens to focus an image of the target object onto the pixel array, the lens movable along a path of travel, the automatic imaging system comprising:
   a) ranging circuitry for analyzing an image of the beam pattern reflected from the target object and projected onto the pixel array by the lens and employing a distance algorithm to determine a distance between the imaging system and the target object;
   b) upon determination of the distance, the automatic focusing system causing the lens to move along the path of travel to a position suitable for satisfactorily focusing an image of the target object onto the pixel array;
   c) focus analysis circuitry embodying a search routine and image analysis, if the distance cannot be ascertained by the ranging circuitry, the focus analysis circuitry causing the lens to move along its path of travel in accordance with the search routine, using the image analysis to analyzing images of the target object at different lens positions as the lens is moved along its path of travel and stopping the movement of the lens when a suitable lens position is found.

13. The automatic focusing system of claim 12 wherein aiming apparatus of the automatic identification system is a laser aiming apparatus generating a laser beam pattern and the ranging circuitry of the automatic focusing circuitry is laser ranging circuitry.

14. The automatic identification system of claim 13 wherein the laser beam pattern includes a plurality of spaced apart dots and the distance algorithm uses first and a second spaced apart dots to verify that the aiming pattern has been properly located in the image projected onto the pixel array, wherein upon locating the first dot in the image, the location of the second dot is predicted using coordinates of the first dot and the geometric relationship between the first and second dots, then locating the second dot and comparing its location to predicted location of the second dot.

15. The automatic focusing system of claim 12 wherein the target object is a bar code to be imaged and decoded.

16. The automatic focusing system of claim 12 wherein the lens is moved along its path of travel by a piezo motor and the automatic focusing system is coupled to the piezo motor and actuates the piezo motor to move the lens along its path of travel.

17. The automatic focusing system of claim 12 wherein the distance algorithm is a parallax distance algorithm based on the parallax or offset between a beam of the beam pattern and an imaging axis.

18. The automatic focusing system of claim 12 wherein the analysis of images of the target object at different lens positions utilizes a depth from focus method.

19. The automatic focusing system of claim 12 wherein the search routine used in moving the lens to different lens positions is median position search routine.

20. A method of focusing an image of a target object on an imaging system of an automatic identification system including an aiming apparatus generating a beam to aid in aiming the system at a target object when the system is actuated and an imaging system including a pixel array, a focusing lens to focus an image of the target object onto the pixel array, the lens movable along a path of travel, the steps of the method comprising:
   a) providing an automatic focusing system operating to move the lens along the path of travel to a position suitable for properly focusing an image of the target object onto the pixel array;
   b) analyzing an image of the beam reflected from the target object and projected onto the pixel array by the lens and employing a distance algorithm to determine a distance between the imaging system and the target object;
   c) if the distance between the imaging system and the target object is determined, moving the lens along its path of travel to a suitable position for properly focusing the target object onto the pixel array; and
   d) if the distance between the imaging system and the target object is not determined, using a search routine and moving the lens along its path of travel in accordance with the search routine, analyzing images of the target object at different lens positions as the lens is moved along its path of travel and stopping the movement of the lens when a satisfactory lens position is found.

21. The method of focusing an image of claim 20 wherein the aiming apparatus of the automatic identification system is a laser aiming apparatus and the beam is a laser beam generated by the laser aiming apparatus.

22. The method of focusing an image of claim 20 wherein the target object is a bar code to be imaged and decoded.

23. The method of focusing an image of claim 20 wherein the distance algorithm is a parallax distance algorithm based on the parallax or offset between the beam and an imaging axis.

24. The method of focusing an image of claim 20 wherein the beam comprises an aiming pattern including a plurality of spaced apart dots and the distance algorithm uses first and a second spaced aparts dots to verify that the aiming pattern has been properly located in the image projected onto the pixel array, wherein upon locating the first dot in the image, the location of the second dot is predicted using coordinates of the first dot and the geometric relationship between the first and second dots, then locating the second dot and comparing its location to predicted location of the second dot.

25. The method of focusing of claim 20 wherein the analysis of images of the target object at different lens positions utilizes a depth from focus method.

26. The method of focusing of claim 20 wherein the search routine used in moving the lens to different lens positions is median position search routine.

27. A bar code reader comprising:
 a) an aiming apparatus generating a beam to aid in aiming the system at a target object when the system is actuated;
 b) an imaging system including a pixel array, a focusing lens to focus an image of the target object onto the pixel array, the lens movable along a path of travel; and
 c) an automatic focusing system operating move the lens along the path of travel to a position suitable for properly focusing an image of the target object onto the pixel array, the automatic focusing system:
  1) analyzing an image of the beam reflected from the target object and projected onto the pixel array by the lens and the employing a distance algorithm to determine a distance between the imaging system and the target object;
  2) if the distance between the imaging system and the target object is determined, moving the lens along its path of travel to a suitable position for properly focusing the target object onto the pixel array; and
  3) if the distance between the imaging system and the target object is not determined, using a search routine and moving the lens along its path of travel in accordance with the search routine, analyzing images of the target object at different lens positions as the lens is moved along its path of travel and stopping the movement of the lens when a satisfactory lens position is found.

28. The bar code reader of claim 27 wherein the aiming apparatus is a laser aiming apparatus and the beam is a laser beam pattern.

29. The bar code reader of claim 28 wherein the laser aiming apparatus includes a laser diode and a diffractive optical element to project the laser beam pattern on the target object.

30. The bar code reader of claim 28 wherein the laser beam pattern includes a plurality of spaced apart dots and the distance algorithm uses first and a second spaced aparts dots to verify that the aiming pattern has been properly located in the image projected onto the pixel array, wherein upon locating the first dot in the image, the location of the second dot is predicted using coordinates of the first dot and the geometric relationship between the first and second dots, then locating the second dot and comparing its location to predicted location of the second dot.

31. The bar code reader of claim 27 wherein the target object is a bar code to be imaged and decoded.

32. The bar code reader of claim 27 wherein the target object is an object to be imaged.

33. The bar code reader of claim 27 wherein the target object is a signature to be imaged and recognized as matching an individual.

34. The bar code reader of claim 27 wherein the lens is moved along its path of travel by a piezo motor.

35. The bar code reader of claim 27 wherein the distance algorithm is a parallax distance algorithm based on the parallax or offset between the beam and an imaging axis.

36. The bar code reader of claim 27 wherein the analysis of images of the target object at different lens positions utilizes a depth from focus method.

37. The bar code reader of claim 27 wherein the search routine used in moving the lens to different lens positions is median position search routine.

38. The bar code reader of claim 27 wherein the imaging system includes a CCD imager.

39. The bar code reader of claim 27 wherein the imaging system includes a CMOS imager.

* * * * *

UNITED STATES PATENT AND TRADEMARK OFFICE
CERTIFICATE OF CORRECTION

PATENT NO. : 7,303,131 B2
APPLICATION NO. : 10/903792
DATED : December 4, 2007
INVENTOR(S) : Carlson et al.

It is certified that error appears in the above-identified patent and that said Letters Patent is hereby corrected as shown below:

On the Title Page, Item (56), under "OTHER PUBLICATIONS", Line 8, delete "2002,." and insert -- 2002, --, therefor.

On the Title Page, Item (56), under "OTHER PUBLICATIONS", Line 12, delete "Proccedings" and insert -- Proceeding --, therefor.

On the Title Page, Item (56), under "OTHER PUBLICATIONS", Line 13, delete "1995." and insert -- 1995, --, therefor.

In Column 7, Line 13, after "results" insert -- in: --.

In Column 11, in Equation (28), delete " $N \cdot E_t \cdot f < 7 \times 10^{-4} f^{0.75} H^{-0.25}$ " and insert -- $N \cdot E_{t \cdot f} < 7 \times 10^{-4} f^{0.75} H^{-0.25}$ --, therefor.

In Column 13, Line 21, delete "$\alpha_0$," and insert -- $a_0$, --, therefor.

In Column 13, Line 42, delete "$\alpha_0$," and insert -- $a_0$, --, therefor.

In Column 18, in Table 3, Row Header, Line 2, Entry 8, delete "Gradient" and insert -- Gradient$^2$ --, therefor.

In Column 18, Line 34, in Claim 1, delete "d)" and insert -- c) --, therefor.

Signed and Sealed this

Fourteenth Day of December, 2010

David J. Kappos
*Director of the United States Patent and Trademark Office*